United States Patent
Chen

(10) Patent No.: US 9,301,617 B2
(45) Date of Patent: *Apr. 5, 2016

(54) ONE-PIECE OFFICE CHAIR WITH AN ADJUSTING APPARATUS

(71) Applicant: Yung-Hua Chen, Taoyuan County (TW)

(72) Inventor: Yung-Hua Chen, Taoyuan County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/320,759

(22) Filed: Jul. 1, 2014

(65) Prior Publication Data

US 2015/0182026 A1 Jul. 2, 2015

(30) Foreign Application Priority Data

Dec. 31, 2013 (TW) .............................. 102224963 U

(51) Int. Cl.
*A47C 7/44* (2006.01)
*A47C 7/28* (2006.01)
*A47C 1/032* (2006.01)
*A47C 3/30* (2006.01)
*A47C 7/46* (2006.01)
*B60N 2/68* (2006.01)
*B60N 2/22* (2006.01)
*A47C 5/12* (2006.01)

(52) U.S. Cl.
CPC .............. *A47C 7/443* (2013.01); *A47C 1/03255* (2013.01); *A47C 3/30* (2013.01); *A47C 7/282* (2013.01); *A47C 7/44* (2013.01); *A47C 7/46* (2013.01); *B60N 2/22* (2013.01); *B60N 2/68* (2013.01); *A47C 5/12* (2013.01)

(58) Field of Classification Search
CPC ........... A47C 1/03255; A47C 1/03261; A47C 1/032; A47C 1/024; A47C 1/03272; A47C 3/30; A47C 3/00; A47C 3/01; A47C 5/12; A47C 7/282; A47C 7/443; A47C 7/46; A47C 7/02; A47C 7/40; B60N 2/68; B60N 2/682; B60N 2/22; B60N 2/20
USPC ............... 297/452.11, 452.18, 289, 299, 285, 297/314, 302.4, 296, 297, 298, 316, 326
See application file for complete search history.

(56) References Cited

U.S. PATENT DOCUMENTS

| | | | | |
|---|---|---|---|---|
| 4,361,357 | A * | 11/1982 | Pollock | 297/297 |
| 4,364,887 | A * | 12/1982 | Becht et al. | 264/166 |
| 4,380,352 | A * | 4/1983 | Diffrient | 297/61 |
| 4,889,385 | A * | 12/1989 | Chadwick et al. | 297/300.1 |
| 4,966,411 | A * | 10/1990 | Katagiri et al. | 297/300.7 |
| 6,726,286 | B2 * | 4/2004 | Stumpf et al. | 297/452.64 |
| D500,614 | S * | 1/2005 | Chen | D6/716.3 |
| D509,387 | S * | 9/2005 | Chen | D6/708.23 |
| 7,159,943 | B2 * | 1/2007 | Costaglia | 297/323 |
| 7,637,570 | B2 * | 12/2009 | Becker et al. | 297/314 |
| 7,654,616 | B2 * | 2/2010 | Kinoshita et al. | 297/452.56 |
| 7,887,138 | B2 * | 2/2011 | Chen | 297/452.18 |
| 8,029,060 | B2 * | 10/2011 | Parker et al. | 297/300.1 |

(Continued)

*Primary Examiner* — Joshua J Michener
*Assistant Examiner* — Matthew Gitlin
(74) *Attorney, Agent, or Firm* — Rosenberg, Klein & Lee

(57) ABSTRACT

A one-piece office chair made of plastic with an adjusting apparatus comprises a middle axle seat, a seat frame, a back frame, and two armrests which are formed in one-piece to complete the entire chair frame. Furthermore, an adjusting apparatus is applied to provide supports and elasticity for the chair frame, enabling the back frame to adjust the angle in accordance with users' movements, featuring the present invention as an ergonomic design of comfortable seating with easy assembly and light weight.

7 Claims, 9 Drawing Sheets

(56) References Cited

U.S. PATENT DOCUMENTS

| | | | |
|---|---|---|---|
| 8,113,586 B2* | 2/2012 | Chen | 297/303.5 |
| 8,469,454 B2* | 6/2013 | Holt et al. | 297/452.63 |
| 2005/0280300 A1* | 12/2005 | Tin | 297/300.3 |
| 2007/0267911 A1* | 11/2007 | Kinoshita et al. | 297/452.18 |
| 2008/0252124 A1* | 10/2008 | Chen | 297/301.4 |

* cited by examiner

ONE-PIECE OFFICE CHAIR WITH AN ADJUSTING APPARATUS

BACKGROUND OF THE INVENTION

1. Field of the Invention

The present invention relates to an office chair, particularly to one that is formed in one-piece structure of plastic with an adjusting apparatus.

2. Description of the Related Art

A conventional office chair 10 as shown in FIGS. 1 and 2 comprises an underframe portion 11, a seat portion 12, a back portion 13 and two armrests 14, among which the seat portion 12 is the key to be composed with other components. The seat portion 12 of a conventional office chair 10 includes a metal plate 121 combining with a seat pad 122, and the bottom thereof combines a supporting device 123 to mount on a middle column 111 of the underframe portion 11. Besides, the metal plate 121 links up two connection seats 124 on both left and right sides to fix on the armrests 14. With such structure of multi components combination, the conventional office chair 10 is constructed in a complicated method whereby the finished product lacks unity and firmness, plus the heavy weight of metal materials; there is still room for improvements.

On the other hand, a conventional chair made of plastic has a lightweight advantage but the simple structure is more suitable for outdoor activities than offices.

SUMMARY OF THE INVENTION

A primary object of the present invention is to provide an office chair that is formed in one-piece structure of plastic for easy assembly and light weight.

Another object of the present invention is to apply an adjusting apparatus to the one-piece structure of plastic assembly, enabling the seat back to adjust the angle in accordance with users' movements and therefore providing a comfortable seating with the ergonomic design.

To achieve the objects mentioned above, the present invention comprises a one-piece chair frame and an adjusting apparatus; wherein said chair frame includes a middle axle seat with a combination hole arranged beneath and a first convexity at rear; a plurality of supporting arms, each in arc shape and extending from said middle axle seat as a claw under; a seat frame disposed on the surface of said supporting arms; a second convexity arranged at the rear of said seat frame in the middle thereof, relative to said first convexity; a one-piece back frame extending from the rear of the seat frame; and two armrests extending upward from both left and right sides of said seat frame, on top of each a flat surface is formed, and each flat surface further extends to said back frame so as to complete the chair frame; and wherein said adjusting apparatus includes a first tube, a second tube, and a spring inside said first and second tubes; the first and second tubes are coupled and can displace axially with a first socket on a first top correspondingly to said first convexity whereby said first top fitting the bottom of said first tube, and a second socket on a second top corresponding to said second convexity whereby said second top fitting the top of said second tube, thereby enabling the first and second tubes to stretch axially by the spring inside and therefore engaging said first and second sockets with said first and second convexity, so as to provide elastic support to said seat frame and back frame whenever the spring is pressed by the movements of back frame and then adjusts the angle by having the first and second convexity revolving around the first and second sockets.

Furthermore, a first annular loop is arranged to engage a first concave groove inside the seat frame in order to fix the fringe of a seat pad into said first concave groove, and a second annular loop is arranged to engage a second concave groove inside the back frame in order to fix the fringe of a backrest into said second concave groove.

In addition, the seat pad and backrest could be made of nets, cloth, plastic, or a combination of these materials; the back frame has a supporting rib as part of the one-piece chair frame arranged corresponding to the lower back position thereof, at the center of which a positioning hole is organized to dispose an elastic apparatus that connects to a lumbar support at the front thereof.

Moreover, the elastic apparatus comprises a spring and two coupled tubes and connects the front to the back of said lumbar support, enabling the lumbar support to pivots and thus adjusts the angle.

As structures disclosed above, the present invention has a one-piece chair frame for easy assembly and light weight. With the adjusting apparatus, the present invention is able to adjust the angle in accordance with users' movements, providing a comfortable seating with the simple and ergonomic design.

DETAILED DESCRIPTION OF THE PREFERRED EMBODIMENT

Figure 1:
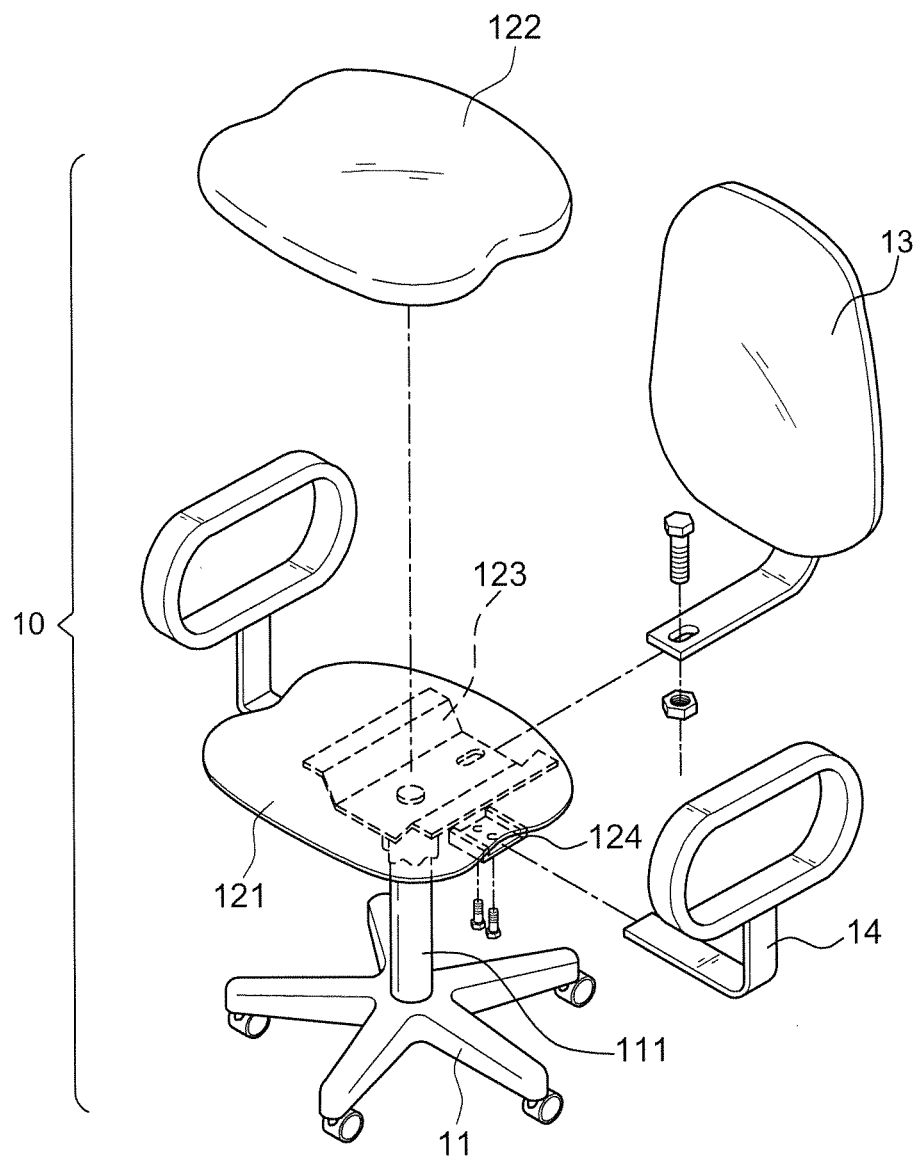
FIG. 1 is an exploded view of a conventional office chair.
Figure 2:
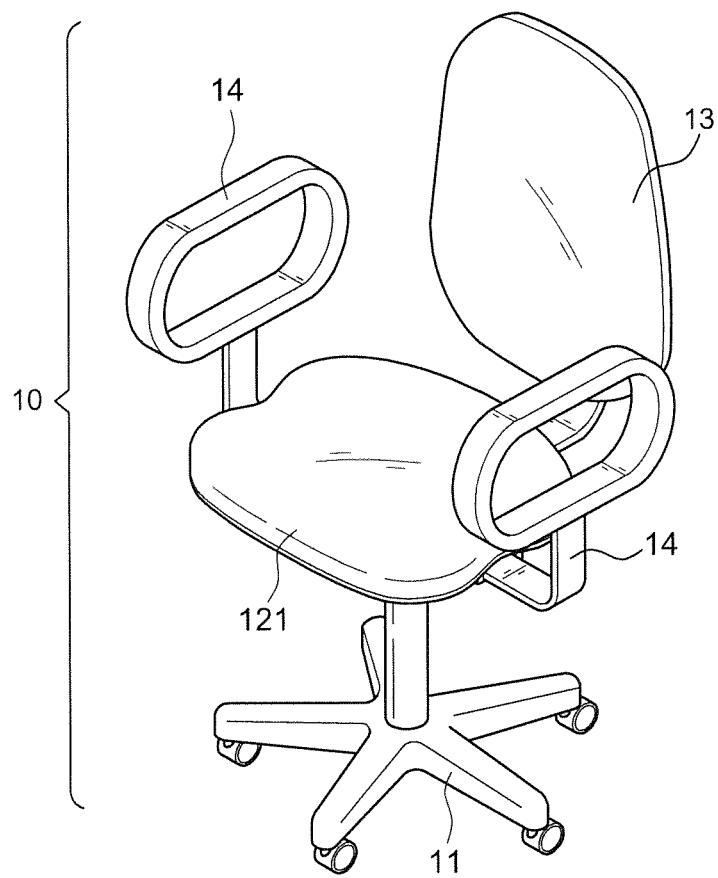
FIG. 2 is a perspective view of a conventional office chair.
Figure 3:
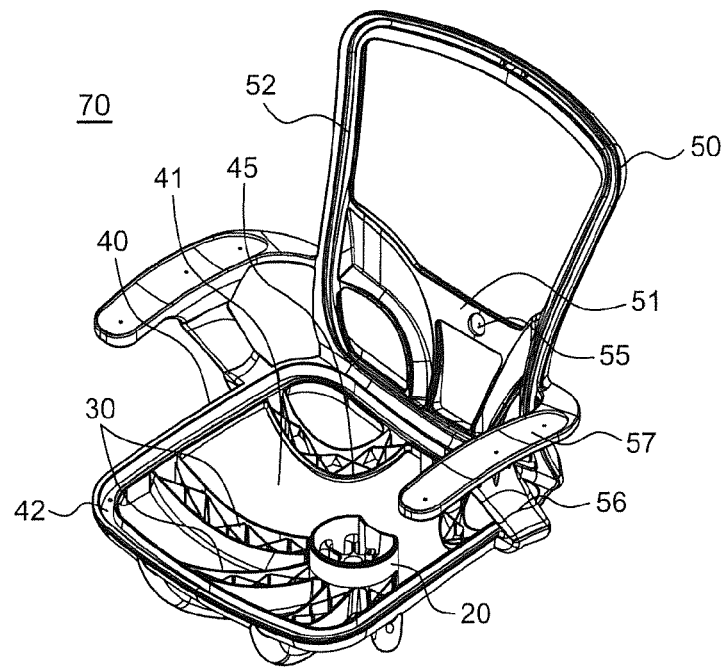
FIG. 3 is a perspective view of the one-piece structure of the present invention.
Figure 4:
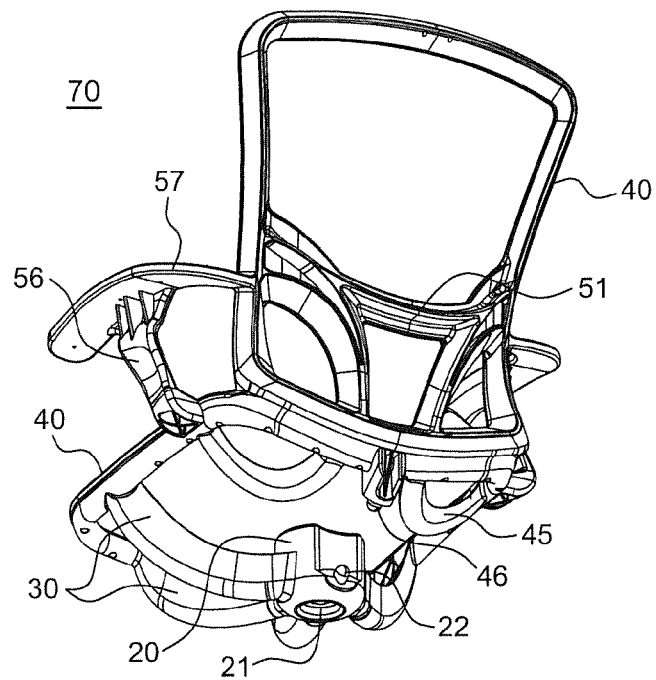
FIG. 4 is a perspective view of FIG. 3 from a different angle of view.
Figure 5:
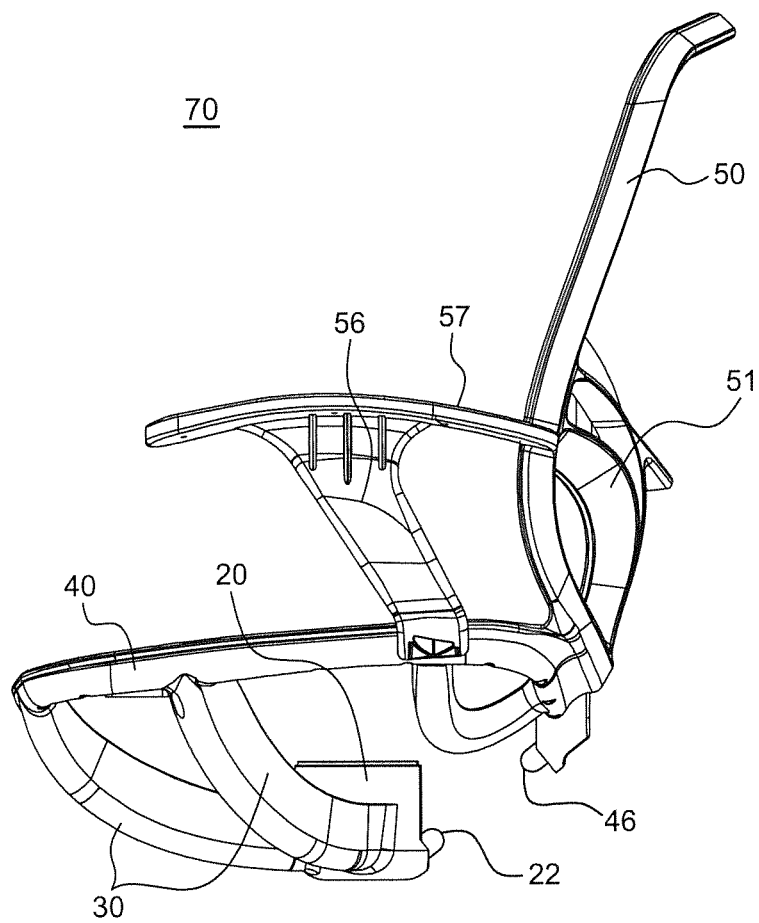
FIG. 5 is a left side elevation view of FIG. 3.
Figure 6:
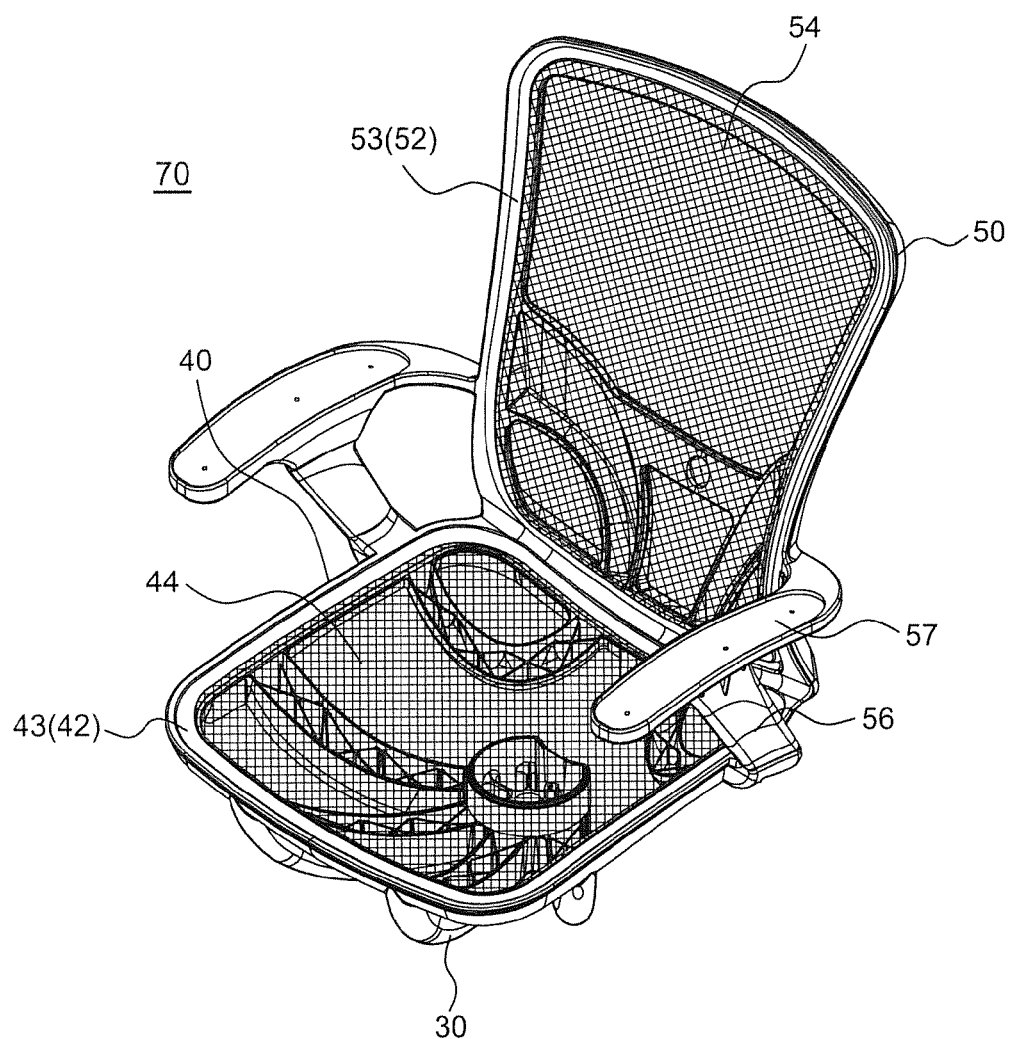
FIG. 6 is a perspective view of the present invention combining the one-piece structure with the seat pad and backrest.
Figure 7:
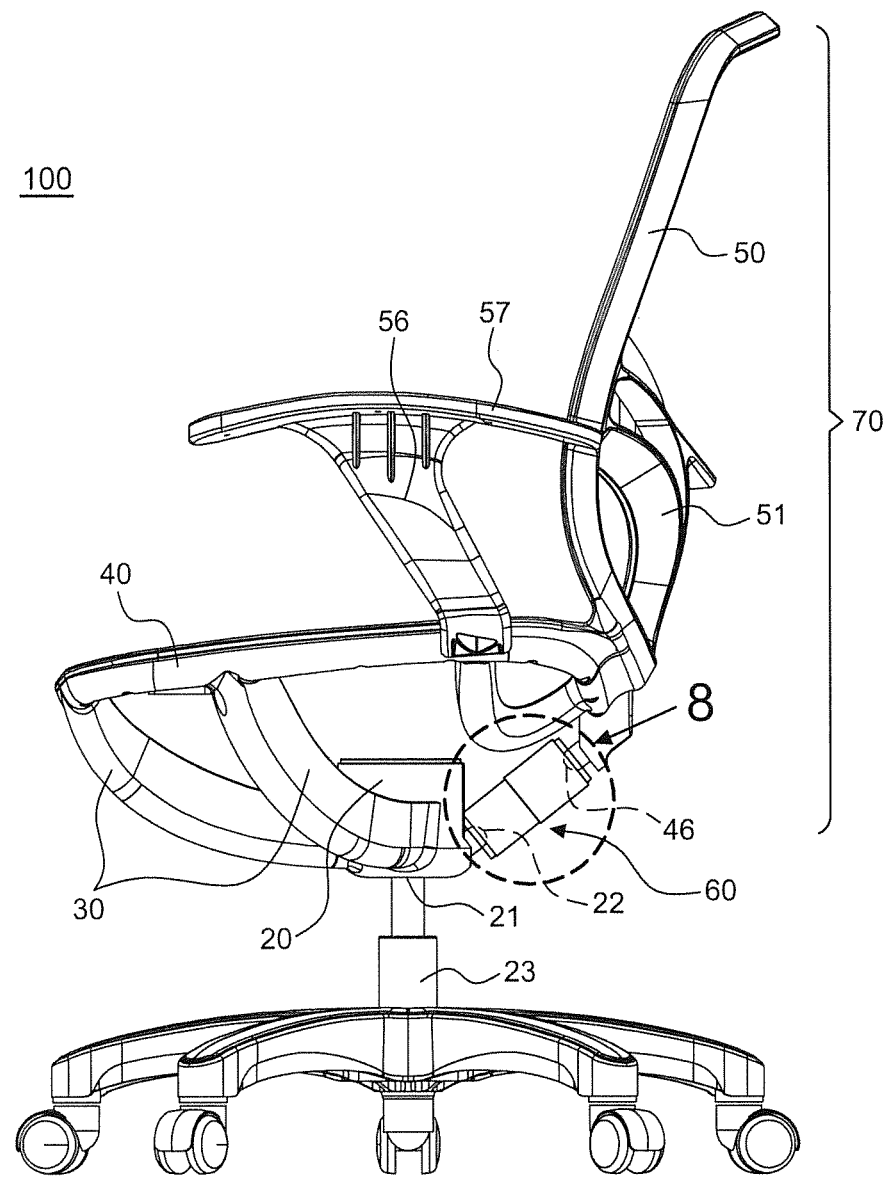
FIG. 7 is a schematic diagram of the present invention.

Referring to FIGS. 1-10, in a preferred embodiment, the present invention, one-piece office chair with an adjusting apparatus 100, comprises a one-piece chair frame 70 and an adjusting apparatus 60.

The chair frame 70 includes a middle axle seat 20, a plurality of supporting arms 30, a seat frame 40, a second convexity 46, a back frame 50, and two armrests 56.

The middle axle seat 20 has a combination hole 21 arranged beneath and a first convexity 22 at rear; a plurality of supporting arms 30, each in arc shape, extend from the middle axle seat 20 as a claw under. In this embodiment, the combination hole 21 of the middle axle seat 20 is to be mounted into an under-frame column 23 of an office chair.

The seat frame 40 is disposed on the surface of the supporting arms 30. In the preferred embodiment, the sear frame 40 has a first concave groove 42 inside and an empty space 41 under at the rear without supporting arms, enabling the elasticity of the present invention. Plus, there are two supplementary supports 45 disposed at the rear as well.

The second convexity 46 is arranged in the middle of the seat frame 40 at the rear thereof, relative to the first convexity 22. The one-piece back frame 50 is formed by extending upward from the rear of the seat frame 40. In the embodiment, the back frame 50 has a supporting rib 51 as part of the one-piece chair frame 70, inside of which there is a second concave groove 52.

Two armrests 56 are formed by extending upward from both left and right sides of the seat frame 40, on top of each a flat surface 57 is formed as well, and each flat surface 57 further extends to the back frame 50 so as to complete the chair frame 70.

Furthermore, a first annular loop 43 is arranged to engage a first concave groove 42 inside the seat frame 40 in order to fix the fringe of a seat pad 44 into the first concave groove 42, and a second annular loop 53 is arranged to engage a second concave groove 52 inside the back frame 50 in order to fix the fringe of a backrest 54 into the second concave groove 52. In the embodiment the seat pad 44 and the backrest 54 are made of nets but the present invention is not limited to such application. Cloth, plastic, or any of the combination is also applicable.

Figure 8:
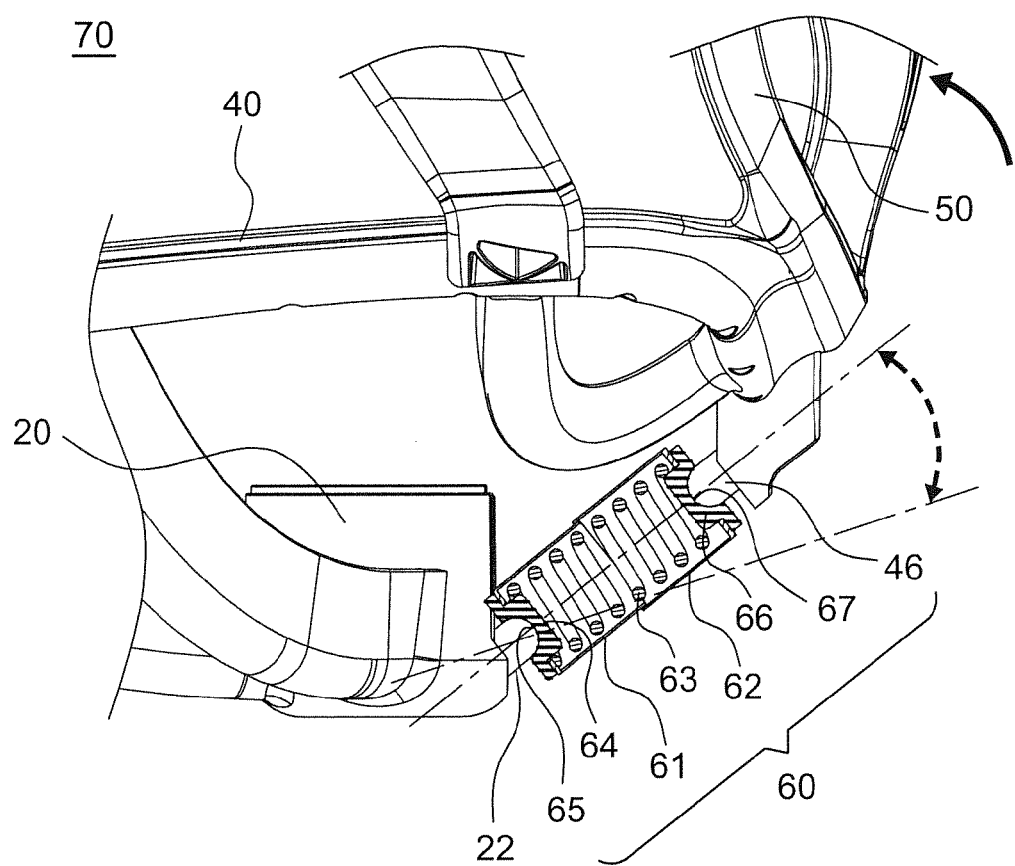
FIG. 8 is a partial cross-section view of the present invention illustrating the stretching of the spring when the seat back moves forward.
Figure 9:
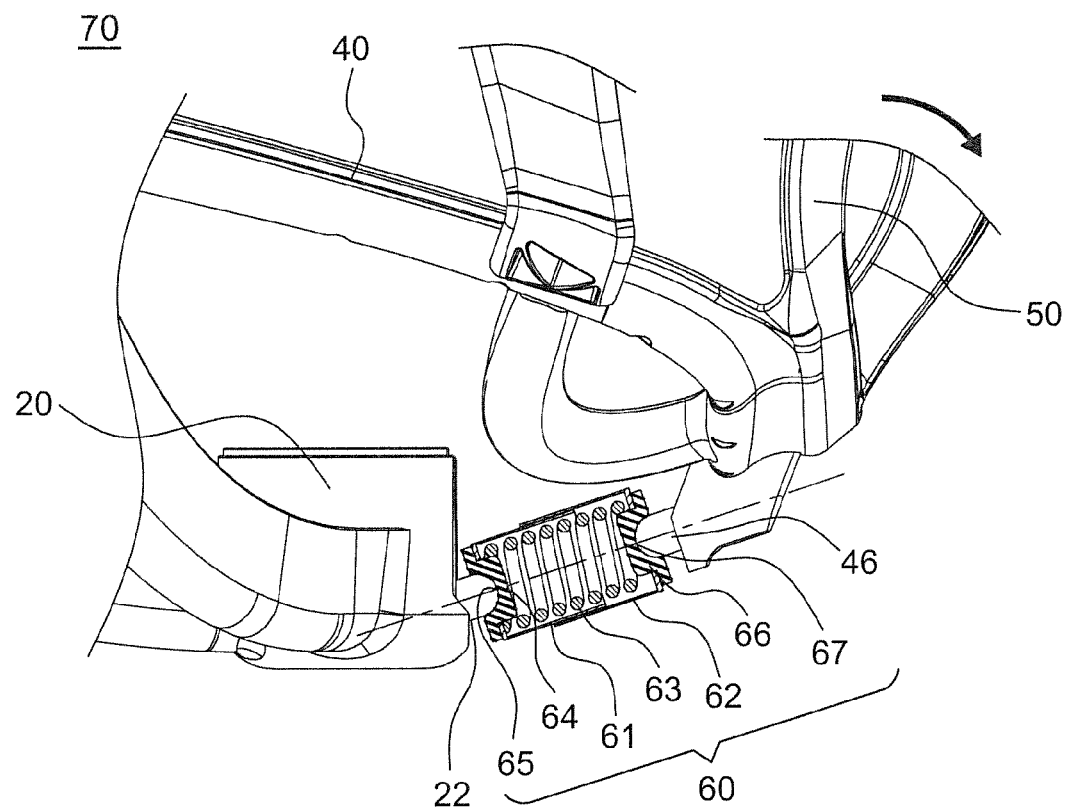
FIG. 9 is a partial cross-section view of the present invention illustrating the contracting of the spring when the seat back moves backward.

Apart from the one-piece frame structure, the present invention further has an adjusting apparatus 60 providing supports and elasticity for the chair frame. As shown in FIGS. 8 and 9, the adjusting apparatus 60 includes a first tube 61, a second tube 62, and a spring 63 inside the first and second tubes 61, 62. The first and second tubes 61, 62 are coupled and able to displace axially with a first socket 65 on a first top 64 correspondingly to the first convexity 22 whereby the first top 64 fits the bottom of the first tube 61, and a second socket 67 on a second top 66 corresponding to the second convexity 46 whereby the second top 66 fits the top of the second tube 62, thereby enabling the first and second tubes 61, 62 to stretch axially by the spring 63 inside and therefore engaging the first and second sockets 65, 67 with the first and second convexity 22, 46, so as to provide elastic support to the seat frame 40 and the back frame 50 whenever the spring 63 is pressed by the movements of back frame 50, and then adjusts the angle by having the first and second convexity 22, 46 revolving around the first and second sockets 65, 67. In FIG. 8, the spring 63 of the adjusting apparatus 60 is stretching axially when the back frame 50 moves forward, and in FIG. 9, the spring 63 is contracting axially when the back frame 50 moves backward.

The chair frame 70 of the present invention is made of elastic plastic, plus supports from the adjusting apparatus 60, featuring the present invention as a steady and comfortable office chair.

Figure 10:
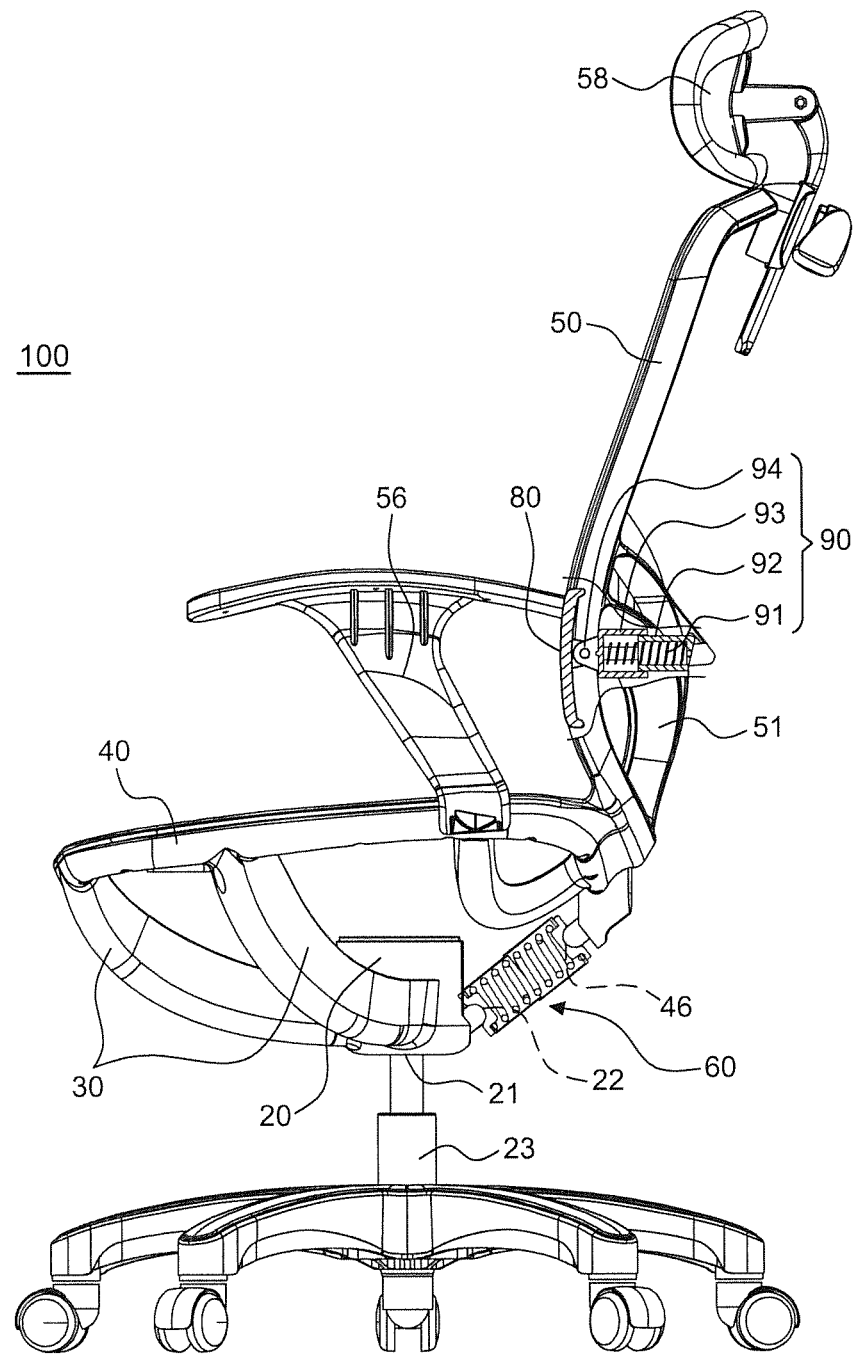
FIG. 10 is a practical application view of the present invention.

Referring to FIG. 10, a practical application view of the present invention, the back frame 50 has a supporting rib 51 as part of the one-piece chair frame 70 arranged corresponding to the lower back position thereof, at the center of which a positioning hole 55 is organized to dispose an elastic apparatus 90 that connects to a lumbar support 80 at the front thereof. Also, a headrest 58 can be disposed on the back frame 50 if needed.

Additionally, the elastic apparatus 90 comprises a spring 91 and two coupled tubes 92, 93 and connects the front to the back of said lumbar support 80 by a tab 94, enabling the lumbar support 80 to pivots and thus adjusts the angle to comfortably fit for the waist.

In conclusion, the present invention has a one-piece chair frame 70 for easy assembly and light weight. With the adjusting apparatus 60, the present invention is able to adjust the angle in accordance with users' movements, providing a comfortable seating with the simple and ergonomic design.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A one-piece office chair with an adjusting apparatus comprising a one-piece chair frame and an adjusting apparatus;
   wherein said chair frame includes:
   a middle axle seat with a combination hole arranged beneath and a first convexity at rear;
   a plurality of supporting arms, each in arc shape and extending from said middle axle seat as a claw under;
   a seat frame disposed on the surface of said supporting arms;
   a second convexity arranged in the middle of said seat frame at the rear thereof, relative to said first convexity;
   a one-piece back frame is formed by extending upward from the rear of the seat frame;
   two armrests extending upward from both left and right sides of said seat frame, on top of each a flat surface is formed, and each flat surface further extends to said back frame so as to complete said chair frame;
   and
   wherein said adjusting apparatus includes a first tube, a second tube, and a spring inside said first and second tubes; the first and second tubes are coupled and able to displace axially with a first socket on a first top correspondingly to said first convexity whereby said first top fitting the bottom of said first tube, and a second socket on a second top corresponding to said second convexity whereby said second top fitting the top of said second tube, thereby enabling the first and second tubes to stretch axially by the spring inside and therefore engaging said first and second sockets with said first and second convexity, so as to provide elastic support to said seat frame and back frame whenever the spring is pressed by the movements of back frame and then adjusts the angle by having the first and second convexity revolving around the first and second sockets.

2. The one-piece office chair with an adjusting apparatus as claimed in claim 1, wherein a first annular loop is arranged to engage a first concave groove inside the seat frame in order to fix the fringe of a seat pad into said first concave groove, and a second annular loop is arranged to engage a second concave groove inside the back frame in order to fix the fringe of a backrest into said second concave groove.

3. The one-piece office chair with an adjusting apparatus as claimed in claim 2, wherein said seat pad and backrest are made of nets, cloth, plastic, or a combination of these materials.

4. The one-piece office chair with an adjusting apparatus as claimed in claim 2, wherein said back frame has a supporting rib as part of the one-piece chair frame arranged corresponding to the lower back position thereof, at the center of which a positioning hole is organized to dispose an elastic apparatus that connects to a lumbar support at the front thereof.

5. The one-piece office chair with an adjusting apparatus as claimed in claim 4, wherein said elastic apparatus comprises a spring and two coupled tubes and connects the front to the back of said lumbar support, enabling the lumbar support to pivots and thus adjusts the angle.

6. The one-piece office chair with an adjusting apparatus as claimed in claim 1, wherein said seat frame has two supplementary supports at the rear.

7. The one-piece office chair with an adjusting apparatus as claimed in claim 1, wherein the combination hole of said middle axle seat is to be mounted into an under-frame column of an office chair.

* * * * *